United States Patent [19]
Williams

[11] Patent Number: 4,502,732
[45] Date of Patent: Mar. 5, 1985

[54] CHILD CAR RESTRAINT

[76] Inventor: Glen Williams, 5221 Saranac St., Montreal, Quebec, Canada, H3W 2G5

[21] Appl. No.: 424,237

[22] Filed: Sep. 27, 1982

[51] Int. Cl.³ .................... A63B 35/00; B60R 21/02
[52] U.S. Cl. ................................. 297/488; 297/471
[58] Field of Search ............... 297/488, 216, 487, 471

[56] References Cited

U.S. PATENT DOCUMENTS

| | | | |
|---|---|---|---|
| 2,738,835 | 3/1956 | Eames | 297/219 X |
| 3,232,665 | 2/1966 | Von Wimmersperg | 297/471 |
| 3,424,497 | 1/1969 | Brilmyer | 297/471 |
| 3,460,791 | 8/1969 | Judd | 297/216 X |
| 3,819,230 | 6/1974 | Bloom | 297/488 X |
| 3,885,810 | 5/1975 | Chika | 297/216 |
| 3,945,678 | 3/1976 | Neuman | 297/488 X |
| 3,948,556 | 4/1976 | Hyde et al. | 297/488 X |
| 4,067,608 | 1/1978 | Von Wimmersperg | 297/488 X |

Primary Examiner—Francis K. Zugel
Attorney, Agent, or Firm—Larson and Taylor

[57] ABSTRACT

A child car restraint comprising a one-piece device having a lower shell area adapted to cover the lap of a seated child and an upper shell area adapted to cover the torso of a seated child. The two areas are joined together in the hip area of a seated child. The device is constructed to have a seat lap belt pass over the device where the areas are joined to hold the device against a seated child. A brace extends between the areas to prevent them from moving any great distance toward each other about their joined area.

10 Claims, 5 Drawing Figures

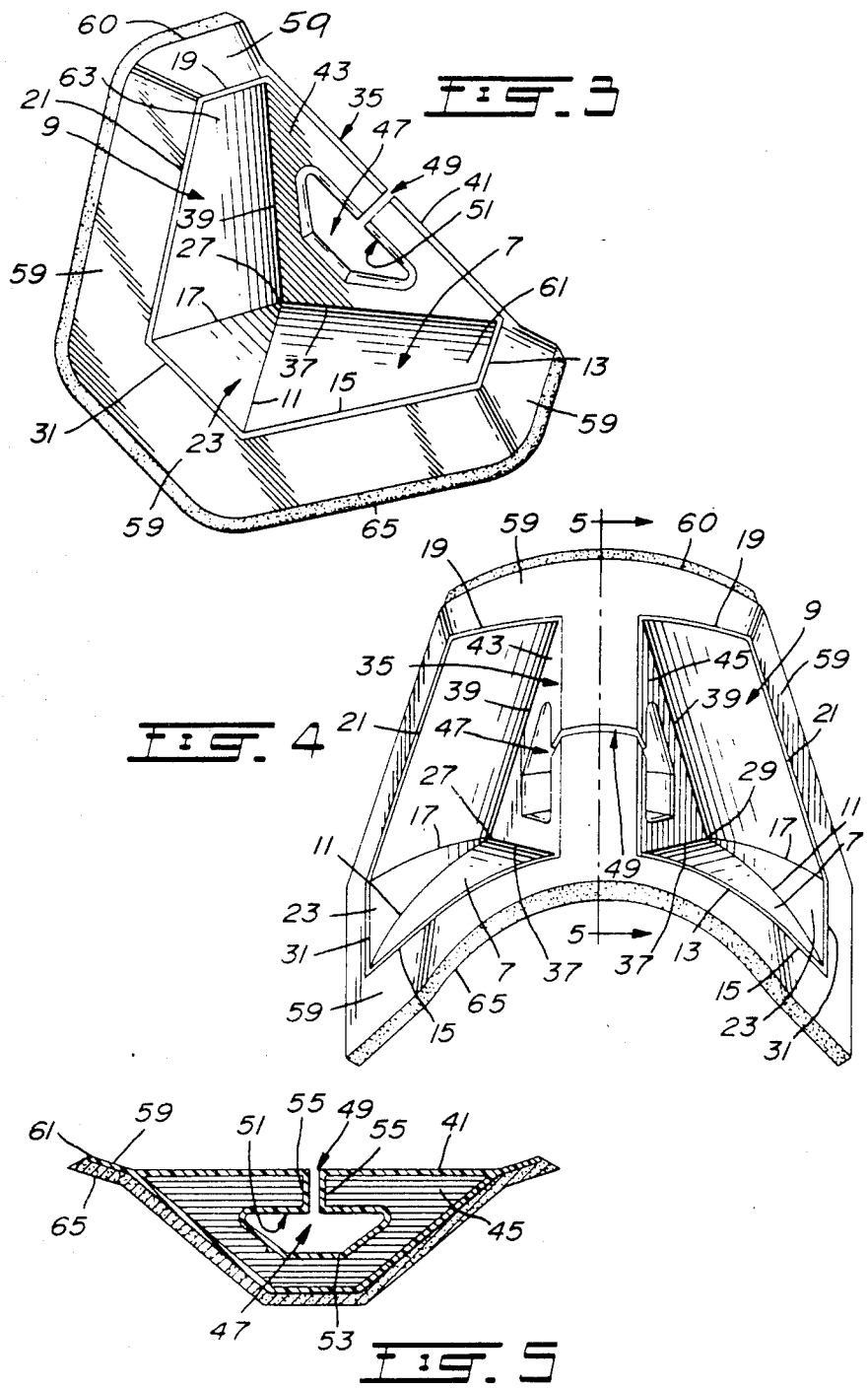

CHILD CAR RESTRAINT

This invention is directed toward an improved, child restraint device.

Devices to restrain children in a sitting position in vehicles, particularly cars, are known. The devices are often employed in place of car seats and are adapted to overlie the waist area of the seated child. A lap seat belt passes over the device to hold the device secure against the child, and to thus hold the child secure against the seat. Examples of such restraint devices are shown in U.S. Pat. Nos. 3,232,665; 3,424,497; and 4,033,623. The known devices are quite cumbersome however having side portions which abut against both the bottom and back of the vehicle seat. Because of their large size, the known devices are also usually quite expensive. The known devices also do not always do a satisfactory job in restraining a child from pivoting forwardly about the lap seat belt in a front end accident, or during a sudden emergency stop.

It is the purpose of the present invention to provide a child restraint device which is compact in size, and lightweight, thereby making it easy to handle, and to position, during use. It is another purpose of the present invention to provide a child restraint device which is relatively inexpensive to manufacture, and thus to buy. It is a further purpose of the present invention to provide a child restraint device having novel structure for restraining the child against pivoting movement about the hips during a sudden stop due to braking or an accident. It is yet a further purpose of the present invention to provide a lightweight, child restraint device which, in cooperation with a seat lap belt, will securely and comfortably restrain a child in a seat against both forward and lateral movement.

Broadly, in accordance with the present invention, there is provided a plastic temporarily deformable restraint device having a compound curved shape to more evenly distribute impact forces over a child's body through the opposition of stresses induced on impact in opposing areas of the device.

In accordance with the present invention, there is provided more specifically a restraint device having two main molded shell areas. One shell area is designed to cover the lap area of a seated child. The other shell area is designed to cover the lower torso of a seated child. The two shell areas are joined together in the hip area of the seated child and a lap seat belt can be passed over the device in the area where the areas are joined together to hold the device against the child.

The two areas are made convex in shape so they wrap about the child when in use. Means are provided on the device, in the vicinity of their join for use in properly locating and positioning the lap belt as it traverses the device in use. The lap belt pulls or holds the joined convex shell areas tight against the child restraining both forward and lateral movement.

The device is molded in one piece from suitable resilient material such as polyethylene. In one embodiment a rigid brace extends between the outer edges of the two shell areas to prevent the shell areas from being able to be moved toward each other about their join. The rigid brace helps restrain the child from being thrown forward during sudden braking or a collision. Preferably, however, the brace is constructed in a manner to provide slight limited movement between the two shell areas during sudden braking or a collision. The limited movement of the top shell area toward the bottom shell area helps absorb the energy of impact of the upper body against the top shell area. In addition, the limited movement of the top shell area toward the bottom shell area produces tensile forces in the sides of the shell areas causing the device to more closely wrap about the child and thus providing additional support and further impact energy absorption. The brace includes means for assisting in locating and positioning the lap belt. Since the device is designed to rest on the lap of a seated child rather than on the vehicle seat, its size is greatly reduced, and much less material is required in its construction than in known devices. The reduced size and weight make it much easier to handle, and more comfortable to the user.

The invention is broadly directed toward a plastic, temporarily deformable, restraint device for use with a vehicle seat lap belt to restrain a sitting child in a vehicle seat. The restaint device has a compound curved shape to more evenly distribute impact forces over the child's body through the opposition of stresses induced on impact in opposing areas of the device.

The invention is particularly directed toward a device for use with vehicle seat lap belt to restrain a sitting child in a vehicle seat. The device has a first shell area for at least partially covering the lap of a sitting child, the first area having an inner and outer edge. A second shell area is provided for at least partially covering the torso of a sitting child, the second area having an inner and outer edge. The first and second areas are joined together along their inner edges. Means extend between the two shell areas to prevent the outer edges of the two shell areas from moving any great distance toward each other about their inner edges.

The invention will now be described in detail having reference to the accompanying drawings in which:

FIG. 3 is a side view of the restraint device;

FIG. 4 is a front view of the restraint device; and

FIG. 5 is a cross-section view taken along line 5—5 of FIG. 4.

Figure 1:
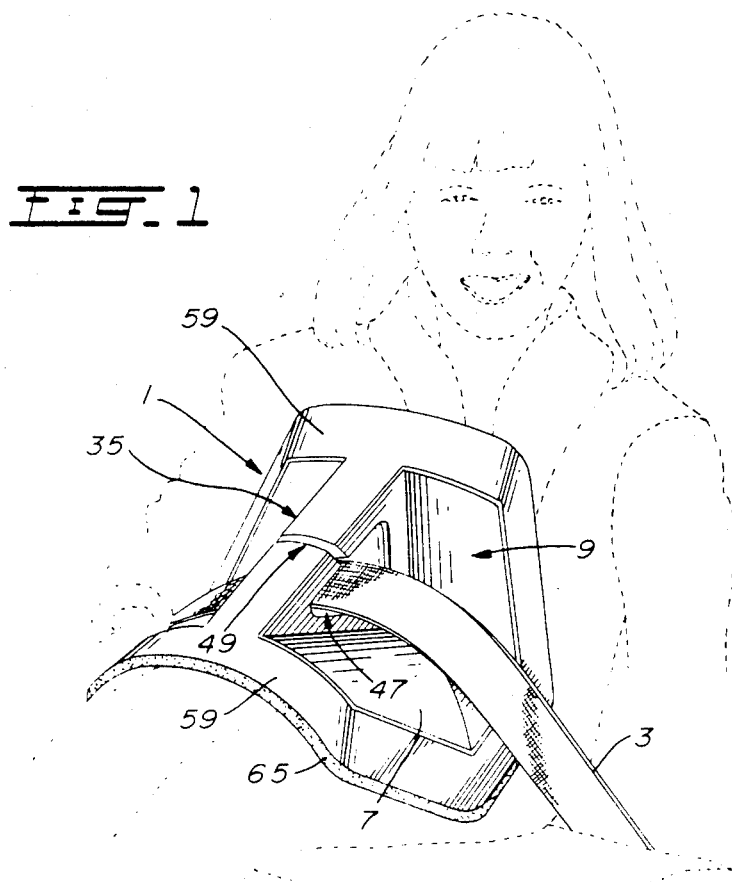
FIG. 1 is a perspective view showing the restraint device in use.

The restraint device 1 of the present invention, as shown in FIG. 1, is adapted to be used with a vehicle lap seat belt 3 to restrain a child, sitting on a vehicle seat 5, from being thrown forward in case of an accident.

Figure 2:
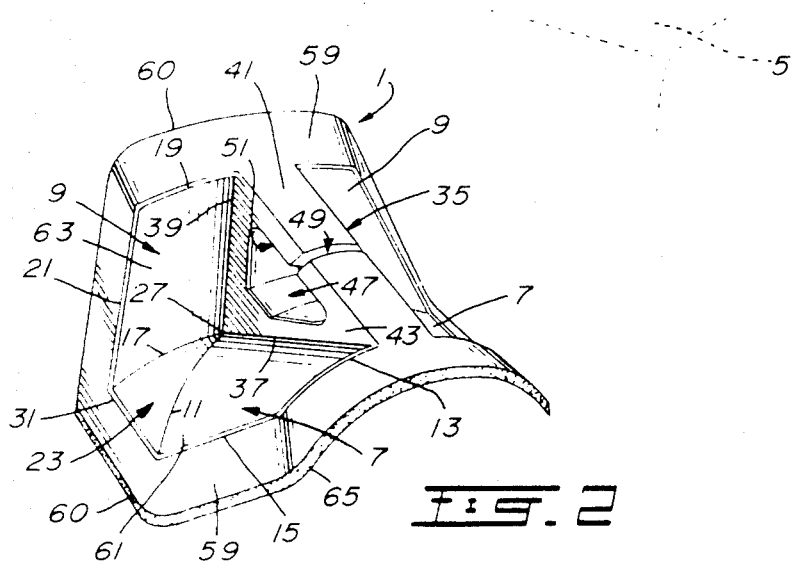
FIG. 2 is a perspective view of the restraint device.

The restraint device 1 has a molded shell divided into a first, lower area 7, adapted to at least partially cover the lap of a sitting child when in use as shown in FIG. 1, and a second, upper area 9, adapted to at least partially cover the lower torso of the sitting child. The first, lower shell area 7 has as shown in FIGS. 2, 3 and 4, an inner edge 11, an outer edge 13, and side edges 15 joining the inner and outer edges 11, 13. The second, upper shell area 9 also has an inner edge 17, an outer edge 19, and side edges 21 joining the inner and outer edges 17, 19 together. The first and second shell areas 7, 9 are joined together along their inner edges 11, 17.

Preferably, two intermediate, triangular-shaped, shell areas 23, 25 are interposed between the first and second shell areas 7, 9 adjacent their side edges 15, 21 respectively. The triangular shell areas 23, 25 are relatively narrow and are arranged with their apexes 27, 29 respectively facing each other. The bases of the triangular shell areas 23, 25 provide side edges 31, 33 respectively connecting the side edges 15 and 21 of the main shell areas 7, 9 respectively. The triangular shell areas 23, 25 provide a transition area between the side portions of the two main shell areas 7, 9. The triangular, shell areas 23, 25 also provide guide surfaces for properly locating the lap seat belt 3 in traversing across the restraint device, as will be described.

The restraint device 1 includes means extending between the two main shell areas 7, 9 which means prevent the outer edges 13, 19 of the two shell areas 7, 9 from moving any great distance toward each other about their inner edges 11, 17. These movement preventing means comprise a brace member 35 extending between the central part of the first shell area 7, located at least at or near its outer edge 13, and the central part of the second shell area 9, located at least at or near its outer edge 19. Preferably the brace member 35 has a generally triangular shape with one side 37 of the triangular brace member 35 located in the central part of the first shell area 7 and extending between the inner and outer edges 11, 13 of the first shell area 7. A second side 39 of the brace member 35 is located in the central part of the second shell area 9 and extends between the inner and outer edges 17, 19 of the second shell area 9. The third side 41 of the triangular brace member 35 extends between the outer edges 13, 19 of the shell area 7, 9 respectively. The triangular brace member 35 preferably has an isosceles triangular shape with sides 37, 39 being the same length.

Preferably, the outer walls 43, 45 of the brace member 35 can extend outwardly from the long side 41 of the brace member 35 toward the apexes 27, 29 of the intermediate, triangular shell areas 23, 25 respectively.

An opening 47 is provided in the brace 35 through which the lap seat belt 3 passes in traversing the restraint device 1. The brace 35 can be a rigid, unitary member. Preferably, however, a slot 49 is provided in the brace 35 extending inwardly from the third, outer side 41 of the brace to the opening 47. The slot 49 severs the bridging section 51 of the brace which section 51 closes the opening 47. The slot 49 facilitates manufacture of the restraint device 1. More importantly, the slot 49 allows limited movement between the shell areas during impact so as to help absorb energy.

The brace member 35, rigid or slotted, can be made from a solid piece of suitable material. Preferably however, the brace is hollow and open from the inside of the device 1. A wall 53, as shown in FIG. 5 extending between the outer walls 43, 45, of the brace defines opening 47. In the slotted brace, parallel end walls 55, 57, extending between the outer walls 43, 45; the opening-defining wall 53 and side 41, define the slot 49 between them.

Preferably, a wide flange 59 extends about the periphery of the device 1, projecting from the outer and side edges 13, 15 of the lower shell area 7, the side edges 31, 33 of the intermediate shell areas 23, 25 respectively, and the outer and side edges 19, 21 of the upper shell area 9. The flange 59 extends the coverage of the device 1, and may be slightly more flexible than the main and intermediate shell areas 7, 9, 23, 25. The outer edge 60 of the flange 59 is rounded to eliminate any sharp corners on the device.

Both main shell areas 7, 9 are slightly convex in shape with the outer convex surfaces 61, 63 of the sections facing each other. This allows the shell areas 7, 9 to "wrap" about the body portions of the child that they are covering. A liner 65 of suitable cushioning material can cover the inner surface of both main shell areas 7, 9; intermediate shell areas 23, 25 and flange 59. The liner 65 can comprise a single layer of suitable, soft cushioning material such as polyurethene foam. Preferably, the liner 65 is made from two layers of material. The inner layer, adjacent the device, would comprise a relatively firm cushioning material such as dense polyurethene foam and the outer layer would comprise a relatively soft cushioning material such as expanded polyurethene foam. The liner 65 is adhesively attached to the device.

The restraint device 1, except for liner 65 is molded in one piece from suitable thermoplastic material such as polyethylene. This provides a restraint that is resilient and that can give on impact thereby absorbing some of the forces generated on impact and also permitting the device to more tightly wrap about a child on impact due to its design.

In use, the restraint device 1 is placed over a seated child with the lower shell area 7 covering a large portion of the child's lap and with the upper shell area 9 covering a large portion of the front of the lower torso of the child. A lap seat belt 3 is then passed across the restraint device 1 through the opening 47 to hold the restraint in place. The side edges 31, 33 of the intermediate shell areas 23, 25 respectively serve to properly located the belt 3 on the device 1, and the belt 3 holds the device 1 in place across the hips of the child. The belt 3 is locked in place securely holding the device 1 against the child. The convex shape of the main shell areas 7, 9 minimize lateral movement of the child. During normal driving, the upper shell area 9, resting against the front of the torso, prevents forward movement of the child. On sudden impact, the upper shell area 9 moves forwardly slightly to distribute the impact forces while still properly supporting the upper body part of the child. When using a device with a rigid, unbroken brace 35, the impact forces travel through brace 35 to press the lower shell area 7 downwardly on the legs helping to dissipate the forces. When using a device with a slotted brace 35, the upper shell area 9 can move slightly toward the lower shell area 7 until the slot is closed thereby helping to dissipate additional force and causing the sides of the shell areas to more closely hug the child. After the slot is closed, additional force is transmitted through brace 35 to the lower shell area 7 as with a rigid brace. As the shell areas 7, 9 tend to move toward each other about apexes 27, 29 thereby creating compression in the brace 35 on impact, the portions of the shell areas 7, 9 adjacent the side edges 31, 33 of the intermediate shell areas 23, 25 tend to move away from each other. This is due to the curvature of the shell areas 7, 9. This tendency sets up tension forces in the intermediate shell areas 23, 25 adjacent their side edges 31, 33 which also help draw the restraint closer about the child while helping dissipate the impact force.

The embodiments of the invention in which an exclusive property or privilege is claimed are defined as follows:

1. A device for use with a vehicle seat lap belt to restrain a sitting child in a vehicle seat; the device having a first curved shell area for at least partially wrapping about the lap of a sitting child; the first shell area having an inner edge, an outer edge and side edges; a second curved shell area for at least partially wrapping about the torso of a sitting child; the second shell area having an inner edge, an outer edge and side edges; the first and second shell areas joined together by their inner edges with their convex surfaces facing each other; and brace means extending between the two shell areas for preventing their outer edges from moving any great distance toward each other, said movement preventing brace means located midway between the side edges of both shell areas and extending from about the outer edge of the first shell area to about the outer edge of the second shell area.

2. A device as claimed in claim 1 wherein the brace member has means in its length permitting slight limited movement of the outer edges of the two shell areas toward each other.

3. A device as claimed in claim 1 wherein the brace means extending between the two shell areas comprises a brace member having a generally triangular shape, one side of the brace member located in the central part of the first shell area and extending between the inner and outer edges of the first shell area; a second side of the brace member located in the central part of the second shell area and extending between the inner and outer edges of the second shell area; the third side of the brace member extending between the outer edges of the two shell areas.

4. A device as claimed in claim 3 including an opening in the central portion of the triangular brace member through which the vehicle seat lap belt can pass when the device is in use.

5. A device as claimed in claim 5 including a slot in the brace member extending between the central opening and the third side.

6. A device as claimed in claim 1 including two, narrow triangular-shaped shell areas, each triangular shell area interposed between, and joined to, the inner edges of the first and second shell areas, the narrow, triangular shell areas arranged with their apexes facing each other, the triangular shell areas providing transition sections between the first and second shell areas and also providing locating means for the seat lap belt to locate the belt in the proper position to traverse the device when in use.

7. A device as claimed in claim 4 including two, narrow, triangular-shaped shell areas, each triangular shell area interposed between, and joined to, the inner edges of the first and second shell areas, the narrow, triangular shell areas arranged with their apexes facing each other and abutting the triangular brace member, the triangular shell areas providing transition sections between the first and second shell areas and also providing locating means for the seat lap belt to locate the belt in the proper position to traverse the device when in use.

8. A device as claimed in claim 1 including a continuous flange extending about the outer and side edges of the first and second shell areas for extending the coverage of the device.

9. A device as claimed in claim 6 wherein each triangular shell area has a side edge joining one side edge of the first shell area to one side edge of the second shell area, and a continuous flange extends about the outer and side edges of the first and second shell areas, and the side edges of the triangular shell areas to extend the coverage of the device.

10. A device as claimed in claim 9 including a foam liner on the inside surface of the shell areas and flange.

* * * * *